H. W. HOPKINS.
BUTTER MOLD.
No. 60,894.
Patented Jan. 1, 1867.
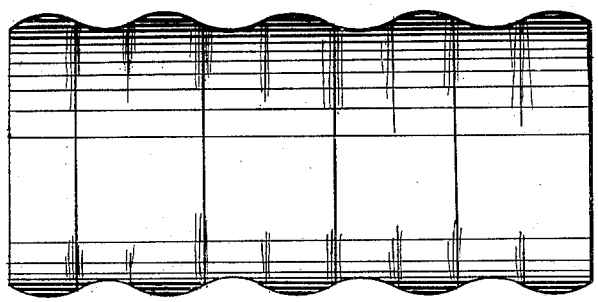
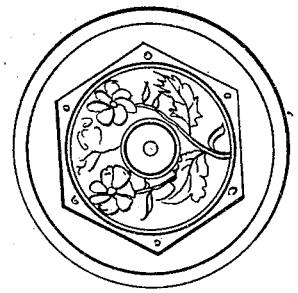

United States Patent Office.

H. W. HOPKINS, OF MILFORD, NEW HAMPSHIRE.

Letters Patent No. 60,894, dated January 1, 1867.

IMPROVEMENT IN BUTTER MOULDS.

*The Schedule referred to in these Letters Patent and making part of the same.*

TO ALL WHOM IT MAY CONCERN:

Be it known that I, H. W. HOPKINS, of Milford, county of Hillsborough, and State of New Hampshire, have invented a new and useful improved Butter Mould; and I do hereby declare that the following is a full, clear, and exact description thereof, which will enable others skilled in the art to make and use the same, reference being had to the accompanying drawings, forming part of this specification.

My invention relates to an article used by dairymen, and which has usually been made of wood. In consequence of the swelling or shrinking of wooden butter moulds it has been almost impossible to produce modelled or print butter in portions of exactly uniform size and weight for the market, while any material suitable for the moulds has been hitherto too expensive for common use. I have discovered that steatite, commonly called "soap-stone," is admirably adapted for the purpose, especially the kind found in this vicinity; while it is almost as easily worked as lumber, it receives a polish nearly equal to fine marble; neither moisture nor change of temperature affects it; and the invention consists in constructing butter moulds of this material by the use of a peculiar kind of cement, hereinafter described, and which I have discovered. In manufacturing my butter moulds, the soap-stone is sawed out and polished in the slab as marble is usually polished, or in a similar way. The slab is then sawed into sections to form moulds of any desired form, size, or angle. The one represented in the drawing is a hexagon, which is the form generally used. These sections, when prepared, I put together with a cement composed of four ounces of best glue, two ounces of Russia isinglass, and two ounces of boiled linseed oil. This forms a perfectly water-proof and durable cement, uniting the parts so firmly that the joint is as strong as the natural stone.

Figure 1 represents a side elevation of this mould; and

Figure 2 represents a horizontal section of it, the interior portion showing the print.

I do not confine myself to any particular form, either for the outside or the inside, nor to any particular size or manner of construction, as the mould may be cut from the solid stone, but I prefer to make it in sections as described.

Having thus described my invention, I claim as new, and desire to secure by Letters Patent—

Constructing butter moulds of steatite or soap-stone, substantially as herein described.

The above specification of my invention signed by me this 30th day of October, 1866.

H. W. HOPKINS.

Witnesses:
   WM. F. McNAMARA,
   ALEX. F. ROBERTS.